United States Patent
Lin

(10) Patent No.: US 9,786,248 B2
(45) Date of Patent: Oct. 10, 2017

(54) TOUCH DISPLAY DEVICE WITH PRESSURE SENSOR

(71) Applicant: Chih-Chung Lin, Taipei (TW)

(72) Inventor: Chih-Chung Lin, Taipei (TW)

( * ) Notice: Subject to any disclaimer, the term of this patent is extended or adjusted under 35 U.S.C. 154(b) by 13 days.

(21) Appl. No.: 14/820,560

(22) Filed: Aug. 7, 2015

(65) Prior Publication Data

US 2017/0038870 A1    Feb. 9, 2017

(51) Int. Cl.
    *G09G 5/00*      (2006.01)
    *G06F 3/147*      (2006.01)
    *G06F 3/041*      (2006.01)

(52) U.S. Cl.
    CPC ............. *G09G 5/003* (2013.01); *G06F 3/041* (2013.01); *G06F 3/147* (2013.01); *G06F 2203/04105* (2013.01); *G09G 2300/0426* (2013.01)

(58) Field of Classification Search
    CPC ...................... G06F 3/0414; G06F 2203/04105
    See application file for complete search history.

(56) References Cited

U.S. PATENT DOCUMENTS

| | | | | |
|---|---|---|---|---|
| 2009/0090694 A1* | 4/2009 | Hotelling | ................ | G06F 3/044 216/41 |
| 2011/0037726 A1* | 2/2011 | Lee | ....................... | G06F 3/0414 345/174 |
| 2011/0115738 A1* | 5/2011 | Suzuki | ..................... | G01L 1/205 345/173 |
| 2013/0147740 A1 | 6/2013 | Wang et al. | | |
| 2014/0216174 A1 | 8/2014 | Aberg | | |
| 2014/0218641 A1* | 8/2014 | Chen | ....................... | G06F 3/041 349/12 |
| 2015/0212579 A1* | 7/2015 | Nakamura | ............ | G06F 1/1626 345/173 |
| 2016/0034087 A1* | 2/2016 | Kim | ....................... | G06F 3/044 345/173 |
| 2016/0088133 A1* | 3/2016 | Kim | ....................... | G06F 1/1643 345/174 |

FOREIGN PATENT DOCUMENTS

| | | |
|---|---|---|
| TW | 200625155 | 7/2006 |
| TW | 201040820 A1 | 11/2010 |
| TW | M443227 U1 | 12/2012 |
| TW | 201335665 A1 | 9/2013 |
| TW | 201349073 A | 12/2013 |
| TW | 201403427 A | 1/2014 |
| TW | 201415452 A | 4/2014 |
| TW | 201426428 A | 7/2014 |
| TW | 201435689 A | 9/2014 |
| TW | 201527119 A | 7/2015 |
| TW | M510493 U | 10/2015 |

\* cited by examiner

*Primary Examiner* — Nalini Mummalaneni
(74) *Attorney, Agent, or Firm* — C. G. Mersereau; Nikolai & Mersereau, P.A.

(57) ABSTRACT

A touch display device includes a touch panel, a liquid crystal display module and a pressure sensation layer. One face of the liquid crystal display module is correspondingly attached to a bottom of the touch panel. The liquid crystal display module corresponds to a touch section of the touch panel. The pressure sensation layer is disposed on the other face of the liquid crystal display module. The touch display device can provide both plane touch and pressure sensation touch effects and the operation of the touch display device is diversified and facilitated.

6 Claims, 8 Drawing Sheets

TOUCH DISPLAY DEVICE WITH PRESSURE SENSOR

BACKGROUND OF THE INVENTION

1. Field of the Invention

The present invention relates generally to a touch display device, and more particularly to a touch display device, which can provide both plane touch and pressure sensation touch effects. The operation of the touch display device is diversified and facilitated.

2. Description of the Related Art

In the current market of various consumptive electronic products, personal digital assistant (PDA), mobile phone, onboard touch screen device and notebook and other portable electronic products have widely employed touch panel as a data communication interface tool between a user and the electronic devices. There are various often seen touch techniques such as resistance-type, capacitance-type and optical touch techniques. When a finger or an electromagnetic pen touches the touch panel, the touch panel can judge the touch position to execute corresponding function. However, the touch technique not only is required to control and operation the product, but also is required to be applicable to writing, graphics and games. Therefore, it is a mainstream to develop touch technique applicable to writing, graphics and games.

With respect to a conventional touch display device, when a user wears a glove or the user's finger is wetted, the touch of the user's finger cannot achieve a corresponding feedback reaction. Moreover, the touch display device can only judge the touch position, while failing to detect the magnitude of touch force. In this case, it is impossible for the touch display device to open a second-order or third-order menu by one touch. This fails to satisfy the more and more required application of human-machine interaction. People need simpler, more convenient and faster human-machine interactive experiences so that many human-machine interactive applications have been developed and produced. The existent pressure sensation touch technique is able to detect the touch pressure of a user and perform different operations according to touch and press. As a core function, the "press" operation is regressed to "right click" mode. Therefore, the touch display device can provide stronger tool or experience for a user in text processing, form processing and game playing. This can be interpreted as a right key of a mouse of the touch display device and will re-change the operation habit and experience of people to further minimize the operation inferiority in comparison with personal computer (PC).

However, in the current pressure sensation touch panel of the conventional touch display device, the magnitude of the pressure applied to the touch panel is detected by way of detecting the contact area. It is known that different users or different fingers have different contact areas. Therefore, such indirect touch pressure detection method is apt to cause imprecise judgment and great error. As a result, such touch pressure detection method cannot be widely applied to various touch display devices. There is not yet any optimal technique for assembling a pressure sensor on the touch display device and this is a bottleneck of the development of the pressure sensation touch technique.

SUMMARY OF THE INVENTION

It is therefore a primary object of the present invention to provide a touch display device, which can provide both plane touch and pressure sensation touch effects.

It is a further object of the present invention to provide the above touch display device, the operation of which is diversified and facilitated.

To achieve the above and other objects, the touch display device of the present invention includes a touch panel, a liquid crystal display module and a pressure sensation layer. The touch panel has a touch section and a peripheral section. The touch section is positioned at a center of the touch panel. The peripheral section surrounds the touch section. The liquid crystal display module is disposed under the touch panel corresponding to the touch section of the touch panel. One face of the liquid crystal display module is correspondingly attached to a bottom of the touch panel. The pressure sensation layer is disposed on the other face of the liquid crystal display module. The touch display device can provide both plane touch and pressure sensation touch effects and the operation of the touch display device is diversified and facilitated.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
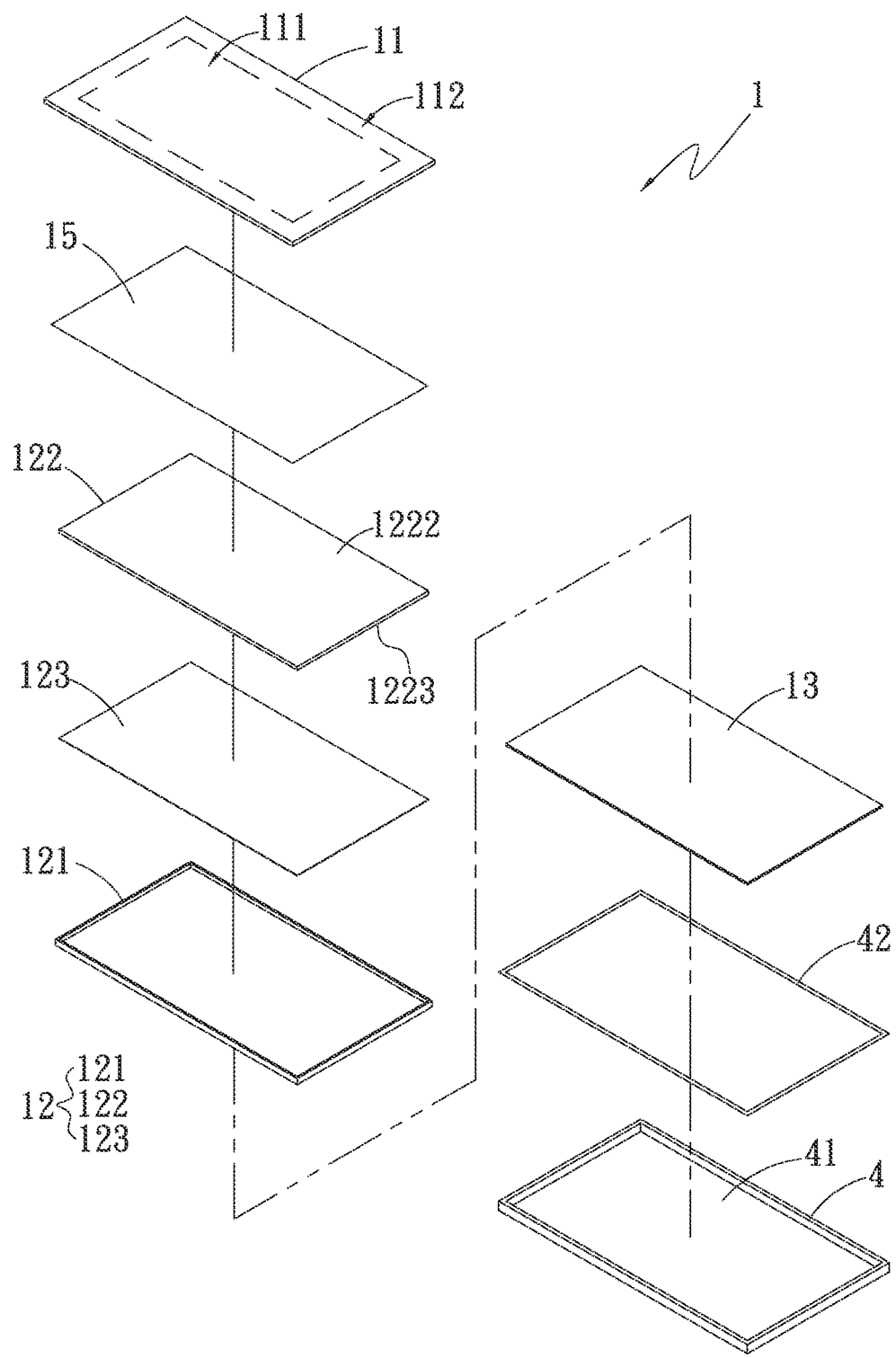
FIG. 1 is a perspective exploded view of a first embodiment of the present invention.
Figure 2:
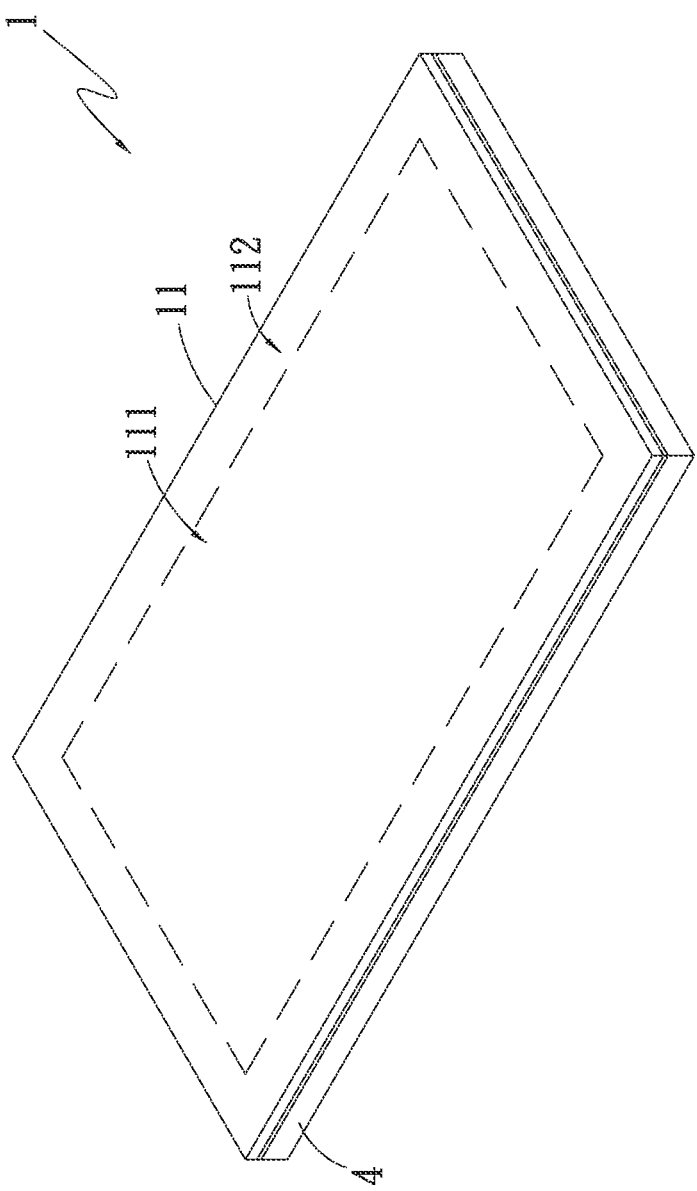
FIG. 2 is a perspective assembled view of the first embodiment of the present invention.
Figure 3:
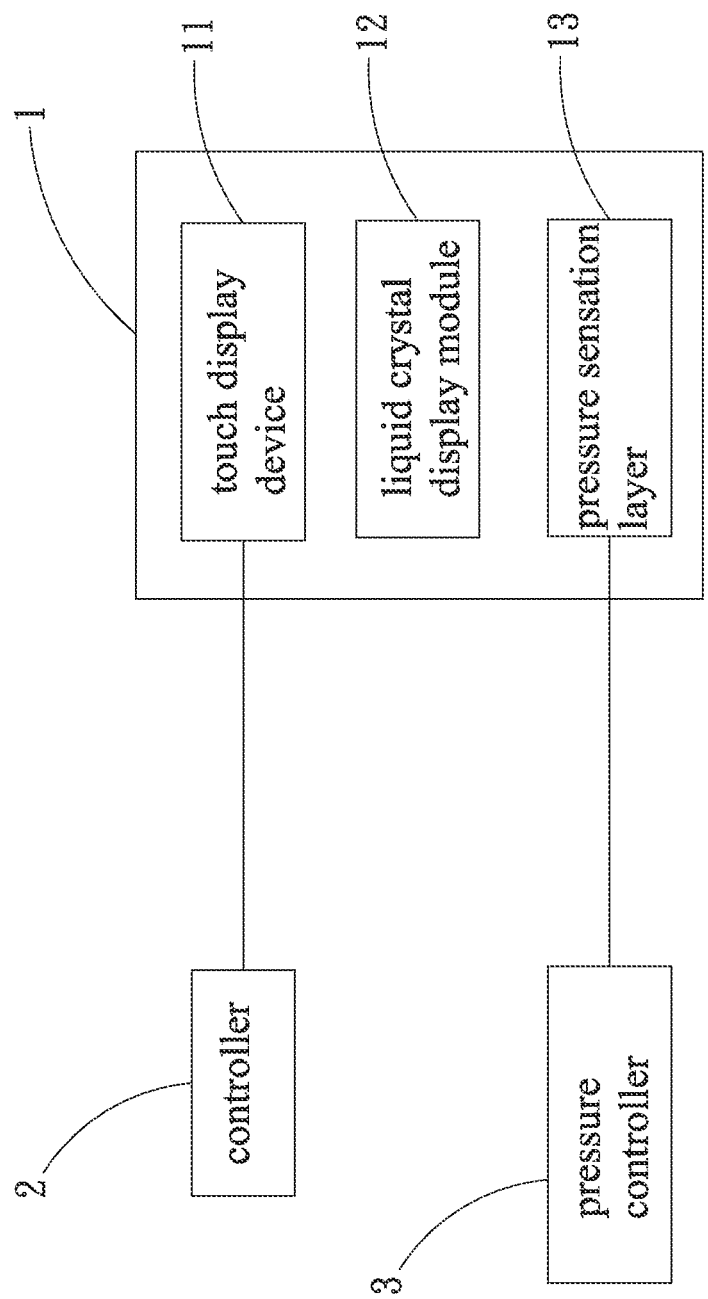
FIG. 3 is a block diagram of the first embodiment of the present invention.

Please refer to FIGS. 1, 2 and 3. FIG. 1 is a perspective exploded view of a first embodiment of the present invention. FIG. 2 is a perspective assembled view of the first embodiment of the present invention. FIG. 3 is a block diagram of the first embodiment of the present invention. Also referring to FIG. 4, in this embodiment, the touch display device 1 is, but not limited to, applied to an intelligent mobile phone for illustration purposes. In practice, the touch display device 1 can be alternatively applied to a personal digital assistant (PDA), a mobile phone, an onboard touch screen device, a notebook or a tablet. The touch display device 1 includes a touch panel 11, a liquid crystal display module 12 (LCM) and a pressure sensation layer 13. In this embodiment, the touch panel 11 is, but not limited to, a one glass solution (OGS) touch panel 11 for illustration purposes. In practice, the touch panel 11 can be alternatively a glass-film (GlF) touch panel or a glass-film-film (GFF) touch panel or any other structure of touch panel.

The touch panel 11 has a touch section 111, a peripheral section 112, a first sensation electrode 113, a second sensation electrode 114, a transparent substrate 115, a wiring layer 116 and a shield layer 117. The touch section 111 (also referred to as visible section) is positioned at the center of the touch panel 11 for a user or a touch object (such as a stylus or a finger) to touch and operate. The peripheral section 112 (also referred to as invisible section) is disposed around the touch section 111. The material of the transparent substrate 115 is selected from a group consisting of glass, polyethylene terephthalate (PET), polycarbonate (PC), polyethylene (PE), polyvinyl chloride (PVC), polypropylene (PP), polystyrene (PS), polymethylmethacrylate (PMMA) and cyclo olefin copolymer (COC). In this embodiment, the material of the transparent substrate 115 is, but not limited to, glass for illustration purposes.

Figure 4:
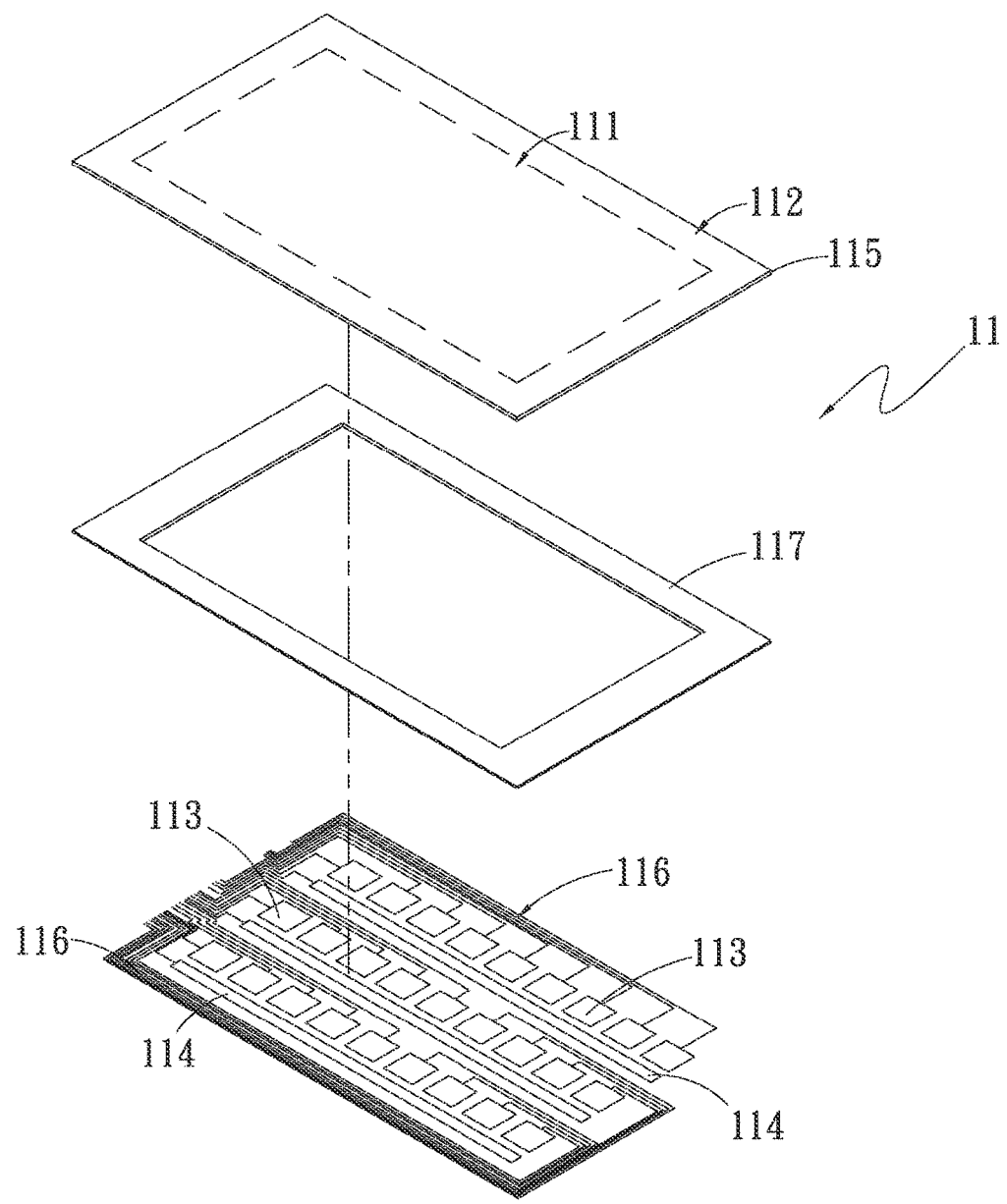
FIG. 4 is a perspective exploded view of the touch panel of the first embodiment of the present invention.

The shield layer 117 is formed on one face of the transparent substrate 115 in the peripheral section 112 to provide shielding and concealing effect. In this embodiment, the shield layer 117 is formed of nontransparent and insulation material and disposed on the face of the transparent substrate by printing or coating. The material of the first and second sensation electrodes 113, 114 is indium tin oxide (ITO) coating or antimony tin oxide (ATO) coating. The first and second sensation electrodes 113, 114 are disposed on one face of the transparent substrate 115 in the touch section 111 in alignment with each other. As shown in FIG. 4, the first and second sensation electrodes 113, 114 are formed on the face of the transparent substrate 115 in the touch section 111 in alignment with each other as one layer. In practice, the first and second sensation electrodes 113, 114 can be formed on the face of the transparent substrate 115 in the touch section 111. In addition, an insulation layer (not shown) is disposed between the first and second sensation electrodes 113, 114 to insulate the first and second sensation electrodes 113, 114 from each other.

The wiring layer 116 is disposed under the shield layer 117 and electrically connected to the first and second sensation electrodes 113, 114 and a controller 2 supporting single-point or multi-point touch. In short, the touch panel 11 is electrically connected to the controller 2. According to a received sensation signal transmitted from the first and second sensation electrodes 113, 114, the controller 2 judges the touch position. Therefore, when a user's finger touches the touch section 111 of the touch panel 11, the controller 2 will judge the touch position according to the received sensation signal generated by the first and second sensation electrodes 113, 114 corresponding to the touch position.

The liquid crystal display module 12 is disposed under the touch panel 11 corresponding to the touch section 111. One face of the liquid crystal display module 12 is correspondingly attached to the bottom of the touch panel 11. That is, by means of an optical adhesive layer 15, the first and second sensation electrodes 113, 114 are attached to the liquid crystal display module 12 correspondingly positioned thereunder. The liquid crystal display module 12 includes a frame body 121, a display panel 122 and a backlight module 123. In this embodiment, the frame body 121 is, but not limited to, a metal frame (such as an aluminum frame) for illustration purposes. Alternatively, the frame body 121 can be a plastic frame. The display panel 122 and the backlight module 123 are received in the frame body 121. The display panel 122 has a display face 1222 and a back face 1223. The display face 1222 of the display panel 122 corresponds to the touch section 111 of the touch panel 11, while the backlight module 123 is disposed under the back face 1223 of the display panel 122. In this embodiment, the display panel 122 includes an upper polarizer, a lower polarizer, an upper substrate, a lower substrate and a liquid crystal layer. The display panel 122 is identical to the conventional display panel in structure and connection relationship and thus will not be further described hereinafter.

Figure 5:
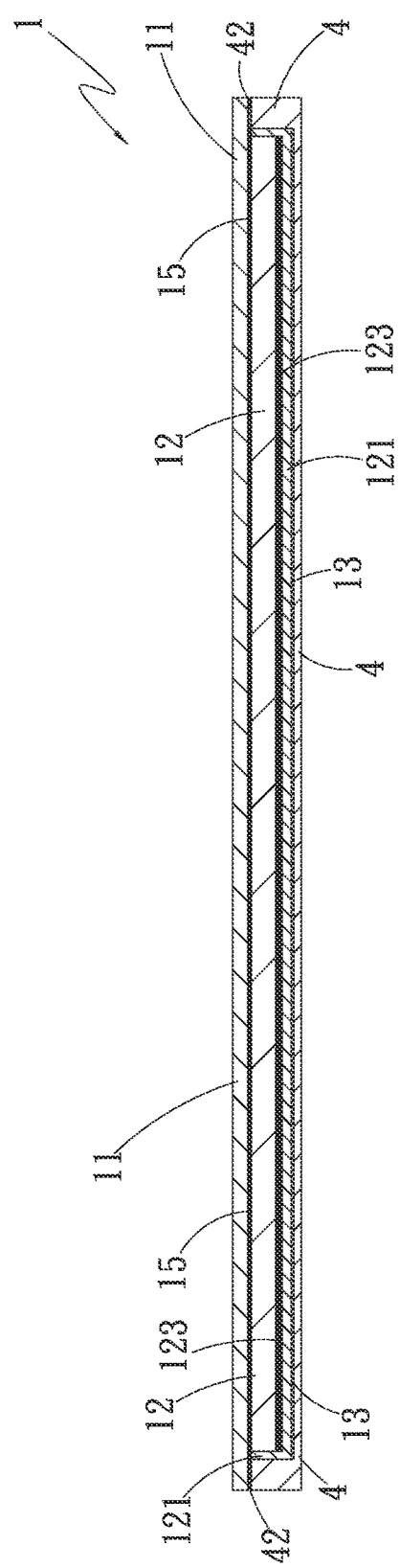
FIG. 5 is a sectional assembled view of the first embodiment of the present invention.

Please further refer to FIGS. 1, 3 and 5. The pressure sensation layer 13 is made of transparent or nontransparent material. The pressure sensation layer 13 is selectively a resistance-type pressure sensation layer or a capacitance-type pressure sensation layer. The pressure sensation layer 13 is disposed on the other face of the liquid crystal display module 12. That is, the pressure sensation layer 13 is formed on an outer side of the frame body 121 corresponding to the backlight module 123. The pressure sensation layer 13 corresponds to the touch section 111 for detecting the magnitude of the pressure applied to the touch section 111 by a user's finger (or a touch object). Also, the pressure sensation layer 13 is elastically deformable along with the change of magnitude of the pressure applied to the touch section 111 to generate a pressure sensation signal. The pressure sensation layer 13 is electrically connected to a pressure controller 3 supporting single-point or multi-point pressure identification. The pressure controller 3 and the pressure sensation layer 13 are together formed on the outer side of the frame body 121 corresponding to the backlight module 123. According to the received pressure sensation signal, the pressure controller 3 judges the magnitude of the pressure applied by the user's finger.

Figure 6:
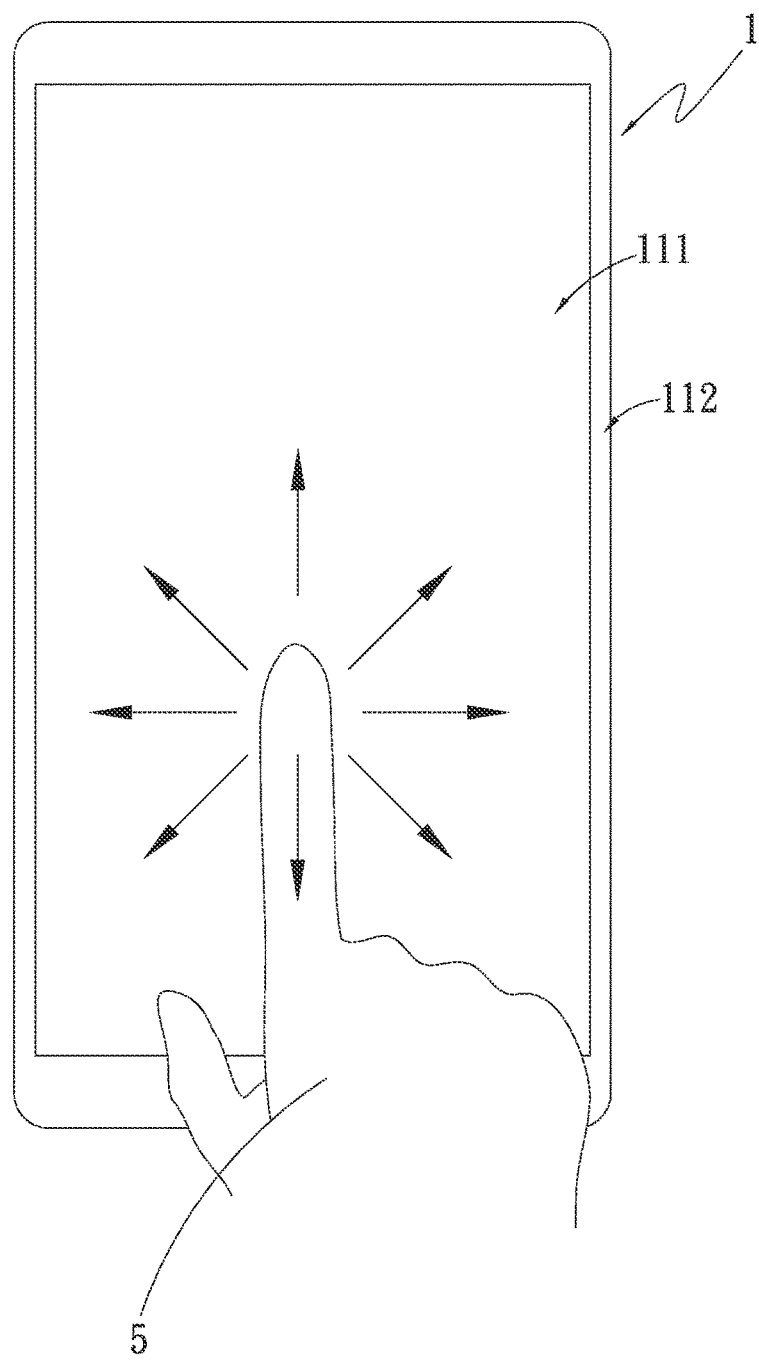
FIG. 6 is a view showing that a user touches the touch section of the first embodiment of the present invention.
Figure 7A:
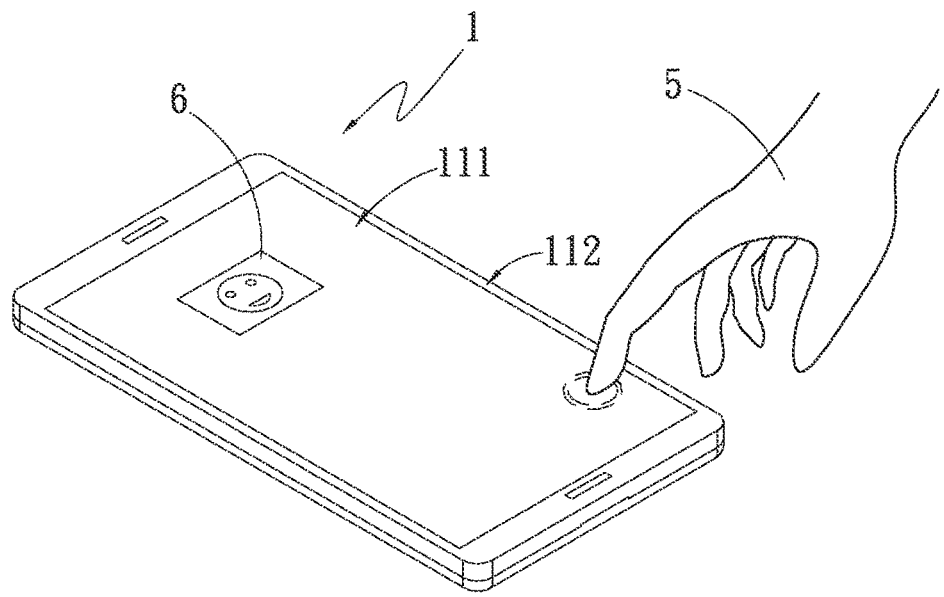
FIG. 7A is a view showing that a user touches and applies pressure to the touch section of the first embodiment of the present invention and the pressure is detected in a first state.
Figure 7B:
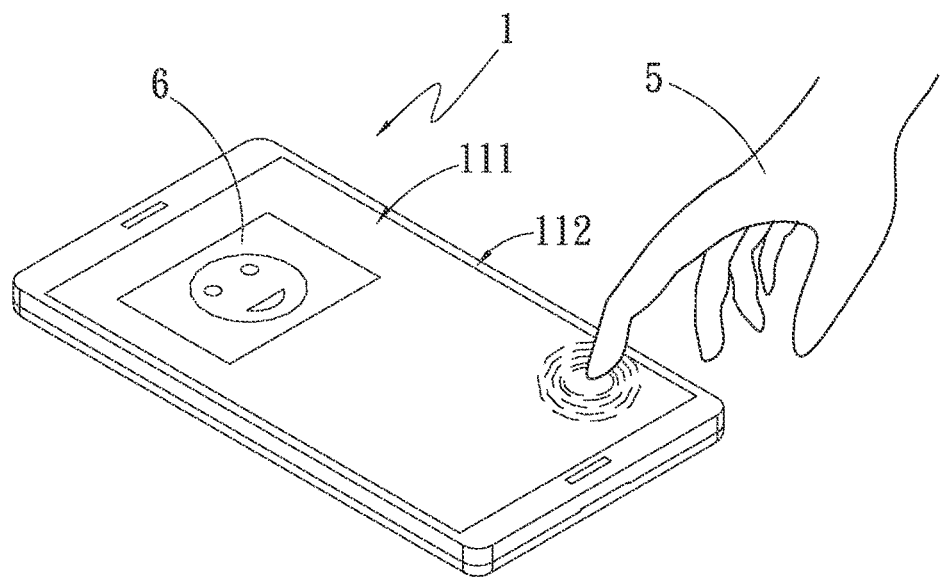
FIG. 7B is a view showing that a user touches and applies pressure to the touch section of the first embodiment of the present invention and the pressure is detected in a second state.

In the present invention, the pressure sensation layer 13 is disposed and connected on the touch display device 1 to detect the magnitude of the pressure applied by a user's finger (or a touch object) to the touch section 111. Therefore, the touch section 111 of the touch display device 1 can provide both plane touch (as shown in FIG. 6) and pressure sensation touch (as shown in FIGS. 7A and 7B) functions. In the case that the pressure sensation touch function is applied to graphics, the change of thickness of the lines can be presented by means of the magnitude of the pressure applied to the touch section 111 to achieve a line presentation effect as the effect provided by a conventional paper and pen. Alternatively, the pressure sensation touch function can be applied to different windows (such as a game or webpage window) to partially substitute for the original touch gestures. For example, the zoom-in and zoom-out of the window picture 6 can be controlled (as shown in FIGS. 7A and 7B) or the volume can be controlled by the pressure sensation touch function. In addition, the pressure sensation layer 13 is disposed under the liquid crystal display module 12. This solves the problem that in the case the touch section 111 of the touch display device 1 has a narrow frame or is frameless, it is impossible to dispose the pressure sensation layer 13.

Furthermore, the touch display device 1 further includes an outer frame 4 for fixedly supporting the display panel 122 and the touch panel 11. The outer frame 4 has a recess 41 for receiving the liquid crystal display module 12 and the pressure sensation layer 13. The pressure sensation layer 13 is positioned between the outer frame 4 and the liquid crystal display module 12. The outer frame 4 is attached to the corresponding touch panel 11 by means of a frame adhesive layer 42, whereby the liquid crystal display module 12 and the pressure sensation layer 13 are enclosed in the outer frame 4.

According to the above arrangement, the touch display device 1 of the present invention can provide both plane touch and pressure sensation touch effects so that the operation is diversified and facilitated.

Figure 8:
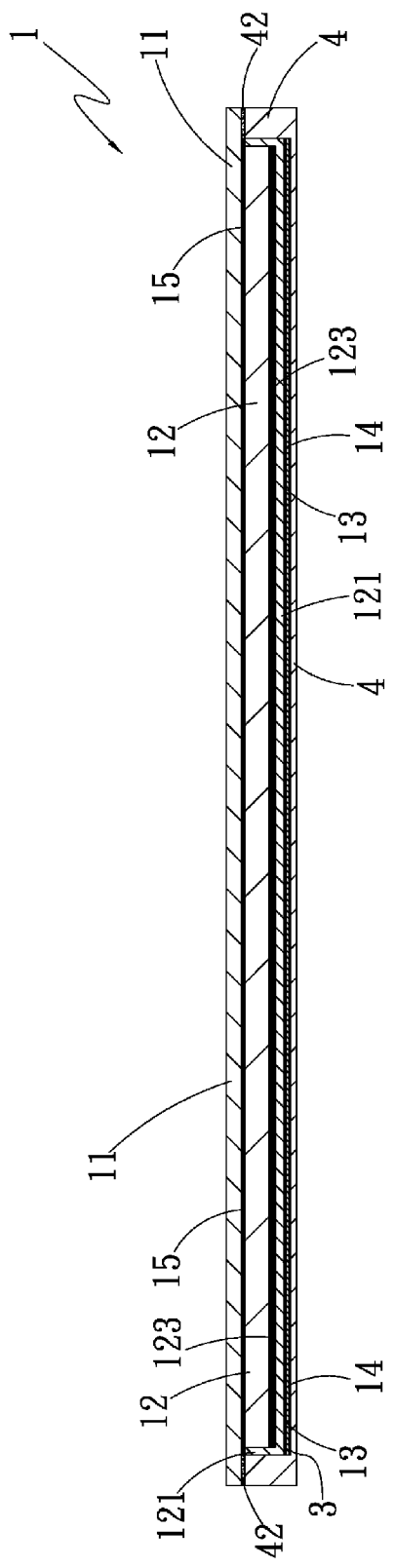
FIG. 8 is a sectional assembled view of a second embodiment of the present invention.

Please now refer to FIG. 8, which is a sectional assembled view of a second embodiment of the present invention. Also referring to FIGS. 6, 7A and 7B, the second embodiment is substantially identical to the first embodiment in structure, connection relationship and effect and thus will not be repeatedly described hereinafter. The second embodiment is mainly different from the first embodiment in that the pressure sensation layer 13 is a single-film pressure sensation film reattachably or non-reattachably adhered to the outer side of the frame body 121. That is, in the second embodiment, the pressure sensation film 13 is positioned under the frame body 121. An adhesive layer 14 is disposed on the pressure sensation layer 13. In this embodiment, the adhesive layer 14 is, but not limited to, an optical clear adhesive (OCA) for illustration purposes. The pressure controller 3 is disposed on the pressure sensation film, (that is, the pressure sensation layer 13). The pressure sensation layer 13 and the pressure controller 3 are tightly attached to the outer side of the frame body 121 by means of the adhesive layer 14 corresponding to the backlight module 123.

In this embodiment, the reattachable or non-reattachable single-film pressure sensation film is applied to the touch display device. In this case, a manufacturer (or a user) can conveniently assemble and attach the pressure sensation film to a common touch display device 1 to additionally provide pressure sensation touch effect. This can diversify and facilitate the operation.

In conclusion, in comparison with the conventional device, the present invention has the following advantages:
1. The present invention can provide both plane touch and pressure sensation touch effects.
2. The operation of the present invention is diversified and facilitated.

The present invention has been described with the above embodiments thereof and it is understood that many changes and modifications in the above embodiments can be carried out without departing from the scope and the spirit of the invention that is intended to be limited only by the appended claims.

What is claimed is:

1. A touch display device comprising: a touch panel having a touch section and a peripheral section, the touch section being positioned at a center of the touch panel, the peripheral section surrounding the touch section; a liquid crystal display module disposed under the touch panel corresponding to the touch section, one face of the liquid crystal display module being correspondingly attached to a bottom of the touch panel; and a pressure sensation layer disposed on the other face of the liquid crystal display module; wherein the liquid crystal display module includes a frame body, a display panel and a backlight module, the display panel having a display face and a back face, the backlight module being disposed under the hack face of the display panel, the display face of the display panel corresponding to the touch section of the touch panel, the display panel and the backlight module being received in and entirely enclosed by the frame body; wherein the pressure sensation layer is formed on an outer side of the frame body corresponding to the backlight module; and wherein the frame body is a metal frame or a plastic frame; wherein the pressure sensation layer is a pressure sensation film, an adhesive layer being disposed on the pressure sensation layer, the adhesive layer being adhered to the outer side of the frame body corresponding to the backlight module; wherein the pressure sensation layer is connected to a pressure controller, the pressure controller being disposed on the pressure sensation layer, the pressure sensation layer and the pressure controller being tightly attached to the outer side the frame body corresponding to the backlight module by means of the adhesive layer.

2. The touch display device as claimed in claim 1, further comprising an outer frame, the outer frame having a recess for receiving the liquid crystal display module and the pressure sensation layer, the pressure sensation layer being positioned between the outer frame and the liquid crystal display module, the outer frame being attached to the corresponding touch panel by means of a frame adhesive layer.

3. The touch display device as claimed in claim 1, wherein the touch panel has a first sensation electrode, a second sensation electrode, a transparent substrate, a wiring layer electrically connected to the first and second sensation electrodes, and a shield layer, the shield layer being formed on one face of the transparent substrate in the peripheral section, the first and second sensation electrodes being disposed and formed on the face of the transparent substrate in the touch section in alignment with each other, by means of an optical adhesive layer, the first and second sensation electrodes being attached to the liquid crystal display module correspondingly positioned thereunder, the wiring layer being disposed under the shield layer.

4. The touch display device as claimed in claim 1, wherein the touch panel has a first sensation electrode, a second sensation electrode, a transparent substrate, a wiring layer electrically connected to the first and second sensation electrodes, and a shield layer, the shield layer being formed on one face of the transparent substrate in the peripheral section, the first and second sensation electrodes being alternately disposed and formed on the face of the transparent substrate in the touch section, the first and second sensation electrodes being insulated from each other, by means of an optical adhesive layer, the first and second sensation electrodes being attached to the liquid crystal display module correspondingly positioned thereunder, the wiring layer being disposed under the shield layer.

5. The touch display device as claimed in claim 3, wherein the touch panel is connected with a controller and the controller is electrically connected to the first and second sensation electrodes and the wiring layer.

6. The touch display device as claimed in claim 1, wherein the pressure sensation layer is electrically connected to a pressure controller, the pressure controller and the pressure sensation layer being together formed on the outer side of the frame body corresponding to the backlight module.

* * * * *